(12) United States Patent
Hikari

(10) Patent No.: US 6,341,676 B2
(45) Date of Patent: *Jan. 29, 2002

(54) ELECTROMAGNETIC BRAKE

(75) Inventor: Kazuo Hikari, Suita (JP)

(73) Assignee: Sanyo Kogyo Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/221,166

(22) Filed: Dec. 28, 1998

(30) Foreign Application Priority Data

Feb. 5, 1998 (JP) .............................. 10-039653

(51) Int. Cl.$^7$ ......................... B60T 13/04; F16D 65/38
(52) U.S. Cl. ................................... 188/161; 188/73.39
(58) Field of Search ................................ 188/161, 163, 188/164, 73.39; 254/274, 310, 356, 375, 378

(56) References Cited

U.S. PATENT DOCUMENTS

| | | | | | |
|---|---|---|---|---|---|
| 3,719,257 A | * | 3/1973 | Maurice | .................. | 188/73.39 |
| 4,219,106 A | * | 8/1980 | Lupertz et al. | .......... | 188/73.39 |
| 4,220,224 A | * | 9/1980 | Karasudani | .............. | 188/73.39 |
| 4,222,465 A | * | 9/1980 | Haraikawa et al. | ...... | 188/73.39 |
| 4,321,984 A | * | 3/1982 | Burgdorf et al. | ......... | 188/73.39 |
| 4,341,289 A | * | 7/1982 | Smith | ...................... | 188/73.39 |
| 4,553,456 A | * | 11/1985 | Mery | ...................... | 188/73.39 |
| 4,573,554 A | * | 3/1986 | Ritsema | ................... | 188/73.39 |
| 4,611,693 A | * | 9/1986 | Wang | ...................... | 188/73.39 |
| 4,775,034 A | * | 10/1988 | Pachner et al. | .......... | 188/73.39 |
| 4,823,920 A | * | 4/1989 | Evans | ...................... | 188/73.39 |
| 5,022,500 A | * | 6/1991 | Wang | ...................... | 188/73.39 |
| 5,167,400 A | * | 12/1992 | Gazel-Anthoine | .......... | 254/275 |
| 5,259,484 A | * | 11/1993 | Idesawa et al. | .......... | 188/73.39 |
| 5,582,277 A | * | 12/1996 | Heidenreich et al. | ....... | 188/171 |
| 5,944,150 A | * | 8/1999 | Hikari | ........................ | 188/161 |

FOREIGN PATENT DOCUMENTS

JP 9-255289 * 9/1997 .................. 188/161

* cited by examiner

Primary Examiner—Robert J. Oberleitner
Assistant Examiner—Robert A. Siconolfi
(74) Attorney, Agent, or Firm—Armstrong, Westerman, Hattori, McLeland & Naughton, LLP

(57) ABSTRACT

An eletromagnetic brake provided with a braking force receiving bracket for receiving tangent force of a pair of brake shoes reciprocating in approaching and parting directions mutually. The braking force receiving bracket is fixed to a fixation member, slide faces, which receive side faces of the pair of brake shoes as the brake shoes can slide, are provided on inner sides of the above bracket, and the above pair of brake shoes are surrounded by the bracket.

2 Claims, 8 Drawing Sheets

ELECTROMAGNETIC BRAKE

BACKGROUND OF THE INVENTION

1. Field of the Invention

This invention relates to an electromagnetic brake mainly used for a hoist gear.

2. Description of the Related Art

As a conventional electromagnetic brake has been used for a hoist gear, etc., a brake having a construction as shown in FIG. 9 and FIG. 10 is known.

That is to say, as shown in FIG. 9 and FIG. 10, in a conventional electromagnetic brake, a U-shaped caliper 61 and an electromagnet portion 62 form a unit 63, and this unit 63 is attached to a fixation member 65 (for attachment) through a floating pin 64.

A brake shoe 66 is attached to an end of the U-shaped caliper 61 through an adjusting screw 67, etc., and another brake shoe 68 is attached to an end of a push rod 69. This push rod 69 is fixed to a movable iron core 70 of the electromagnet portion 62, and the other end of the caliper 61 is fixed and connected to a fixed iron core 72 of the electromagnet portion 62 through an attachment bolt 71.

When the electromagnet portion 62 is switched on, a braked body 73 such as a disk, shown with a two-dot broken line, pressed by the above-mentioned pair of brake shoes 66 and 68, performs brake-working. In this case, pressing force G of the brake shoe 66, pressing force H of the brake shoe 68, and tangent force (working in a direction at right angles with surface of FIG. 9 or FIG. 10) are transmitted through the adjusting screw 67, the caliper 61, the push rod 69, and the movable iron core 70.

However, in a conventional electromagnetic brake as described above, a U-shaped large-volume caliper of block, having sufficient strength and rigidity, is required. And, there is a problem that construction of the brake becomes complicated, and width dimension of the brake in FIG. 9 and FIG. 10 becomes enlarged.

It is therefore an object of the present invention to provide an electromagnetic brake with which the large-volume caliper of block is not necessary, light-weight apparatus in total and simplification of the construction can be obtained.

BRIEF DESCRIPTION OF THE DRAWINGS

The present invention will be described with reference to the accompanying drawings, in which.

DESCRIPTION OF THE PREFERRED EMBODIMENTS

Preferred embodiments of the present invention will now be described with reference to the accompanying drawings.

Figure 1:
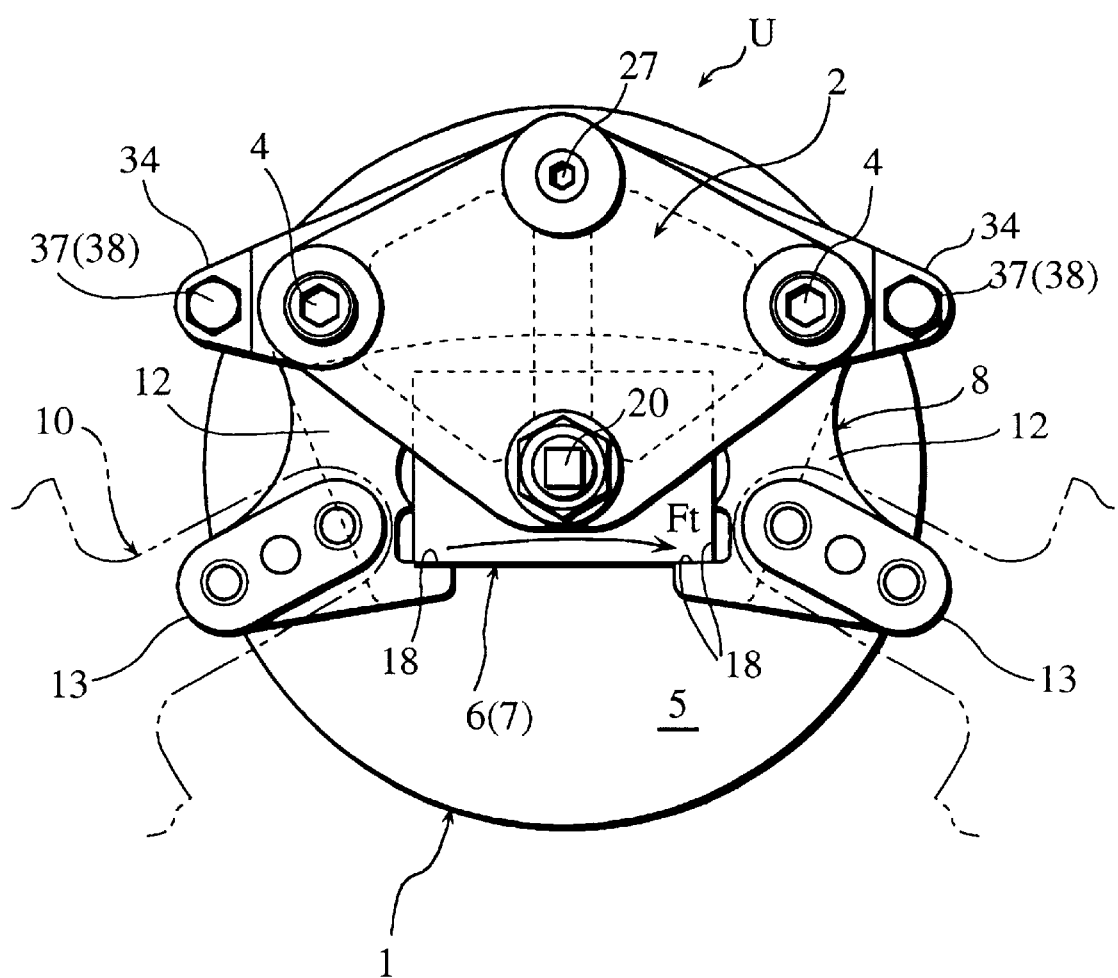
FIG. 1 is a left side view showing a preferred embodiment of the present invention.
Figure 2:
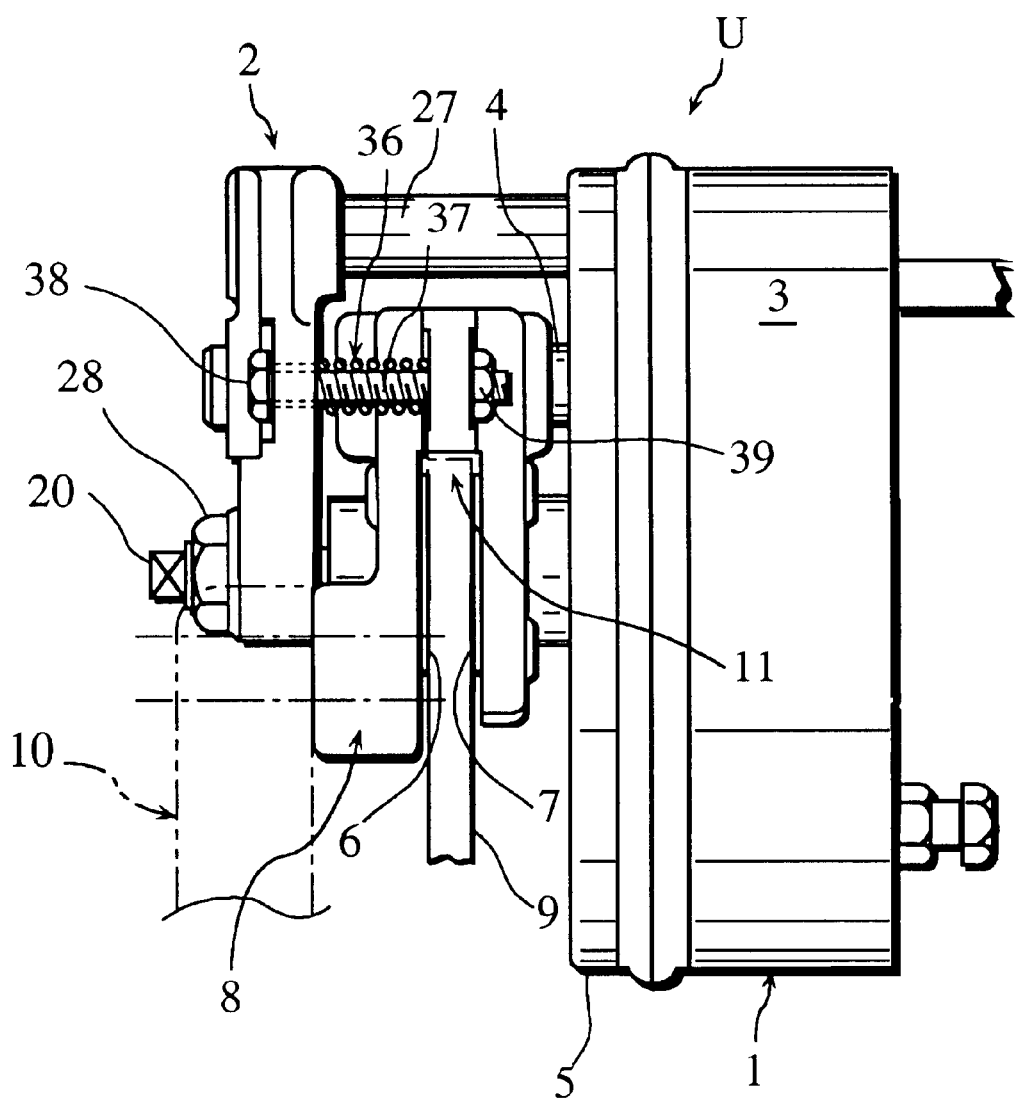
FIG. 2 is a front view showing the preferred embodiment of the present invention.
Figure 3:
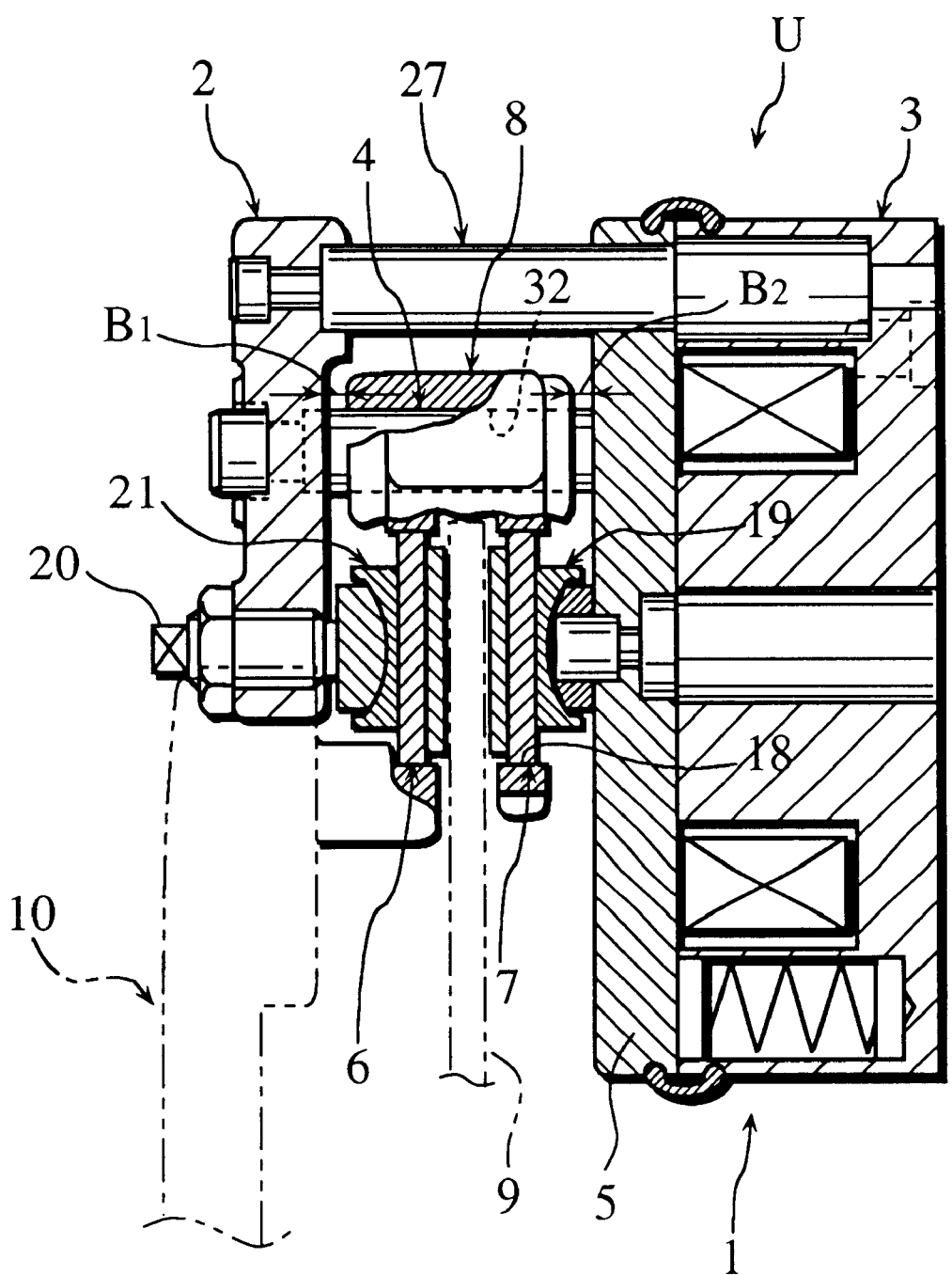
FIG. 3 is a front view showing the preferred embodiment of the present invention with a part of cross-section.

In a left side view of FIG. 1, a front view of FIG. 2, and a front view with a part of cross-section of FIG. 3, this electromagnetic brake has a construction in which a conventional caliper is omitted, and a unit U is formed instead by that a plate body 2 is arranged approximately parallel to an electromagnet portion 1 with a predetermined interval, and a fixed iron core 3 of the electromagnet portion 1 and the plate body 2 are connected and united through plural guiding rods 4.

A braking force receiving bracket 8, for receiving tangent force $F_t$ of one pair of brake shoes 6 and 7, is arranged between the electromagnet portion 1 and the plate body 2 of the unit U.

9 shows a braked body such as a disc (discoid), a plate piece (of belt plate), etc. braked by press of the above-mentioned brake shoes 6 and 7. In the present invention, the tangent force $F_t$ is, among the force the brake shoes 6 and 7 receive from the braked body 9 in braking, a force in running direction of the braked body 9.

In case that the braked body 9 rotationally moves, namely, is a disc, a force in a direction of tangent line works on the brake shoes 6 and 7. This is called tangent force $F_t$ which is shown in FIG. 1 with an arrow. And, in case that the braked body 9 linearly moves, the tangent force is in a direction of the linear movement.

And, the braking force receiving bracket 8 is fixed to a fixation member 10 such as a base (base frame) of a hoist gear, a building, etc. That is to say, the former-described unit U is attached to the fixation member 10 through the bracket 8.

Figures 4A, 4B, 4C:
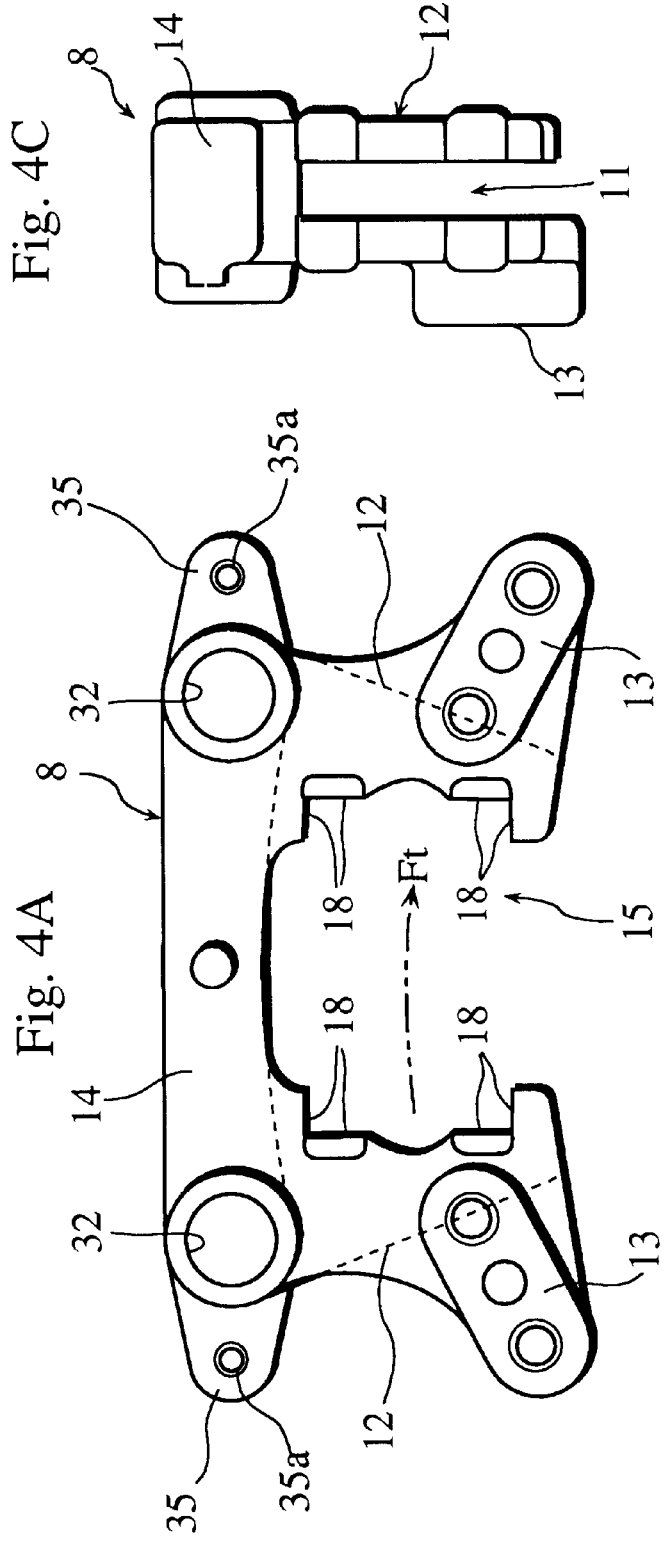
FIG. 4A is an explanatory view showing an example of a braking force receiving bracket.
FIG. 4B is an explanatory view showing the example of the braking force receiving bracket.
FIG. 4C is an explanatory view showing the example of the braking force receiving bracket.

The bracket 8 is, as shown in FIG. 4, having a concave groove 11 to which the braked body 9 is inserted, and arch-shaped as a whole as shown in a front view of FIG. 4A. And, each of left and right leg portions 12 is bifurcated into two branches by the existence of the above concave groove 11. And, a fitting portion 13 with tapped holes is formed on a lower end portion of the leg portion 12, and the bracket 8 is fixed to the above-mentioned fixation member 10 (as shown in FIG. 1 through FIG. 3) by screwing bolts into the tapped holes.

And, the brake shoes 6 and 7 are held within an inner space 15 surrounded by the left and right leg portions 12 of the arch-shaped bracket 8 and an upper side portion 14. In FIG. 5 through FIG. 8, each of the brake shoes 6 and 7 is composed of a brake pad portion 16 which contacts the braked body 9 directly, and a brake shoe main body portion 17 to which the brake pad portion 16 is fixed. Both of the brake pad portion 16 and the brake shoe main body portion 17 are formed into a rectangular plate respectively, layered, and united.

Slide faces 18, which receive side faces 6a and 7a of the brake shoes 6 and 7 at four corner portions of the brake shoes 6 and 7 as to slide in a press-working direction of the brake shoes 6 and 7 (a horizontal direction in FIG. 3 and FIG. 5), are formed on inner sides of the bracket 8. As described above, one pair of brake shoes 6 and 7 are surrounded by the bracket 8, able to slide in the press-working direction of the brake shoes 6 and 7, and held by the bracket 8 not to move in a direction of the tangent force $F_t$. There is a merit that the brake shoes are stably held when the brake shoes 6 and 7 of rectangular plate are held at the four corner portions.

And, the brake shoe 7 of the pair of brake shoes 6 and 7 is attached to a central part of the movable iron core 5 of the electromagnet portion 1 through a centripetal coupling 19. The other brake shoe 6 is attached to the plate body 2 side through an adjusting screw 20 and a centripetal coupling 21.

Further, each one of a pair of return springs 22, continuously pushing the brake shoe 6 and the brake shoe 7 elastically in a direction the brake shoes 6 and 7 part each other, is disposed between the brake shoe 6 and the bracket 8, and the brake shoe 7 and the bracket 8.

Figure 6:
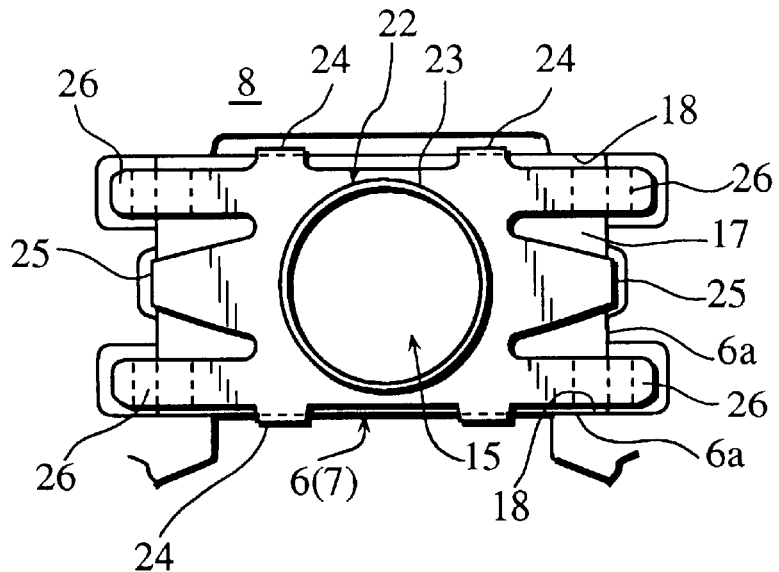
FIG. 6 is an explanatory view with cross-section of a principal portion.
Figure 7:
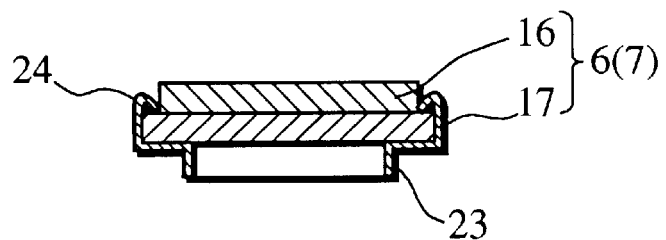
FIG. 7 is an explanatory view with cross-section of a principal portion.
Figure 8:
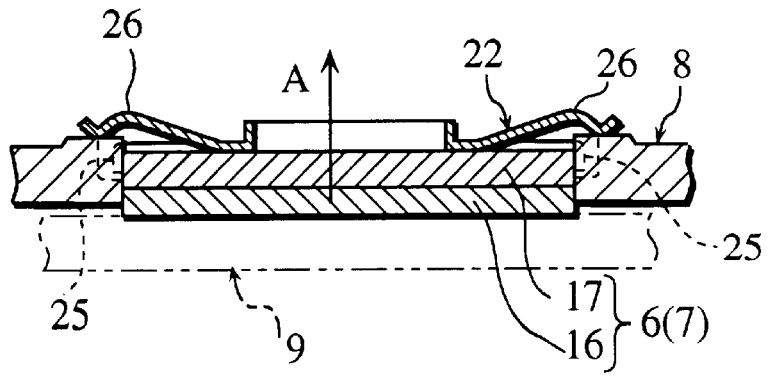
FIG. 8 is an explanatory view with cross-section of a principal portion.

Concretely, the return spring 22 is made by punch press of a piece of steel plate, and the configuration of the return spring 22 is approximately rectangular from which plural leg pieces protrude, and having a short cylinder portion 23 on its center (refer to FIG. 6).

The centripetal coupling 19 or the centripetal coupling 21 is inserted to the short cylinder portion 23 as to slide. And, four of the plural leg pieces described above are J-shaped holding leg pieces 24 huggingly holding long sides of the rectangular brake shoe main body portion 17, and two of the leg pieces are L-shaped hitching leg pieces 25 and 26 hitching on short sides of the brake shoe main body portion 17.

And, plate spring pieces 26 (four pieces in all), disposed above and below the hitching leg pieces 25 (in FIG. 6), contact an outer face of the bracket 8, push the brake shoes 6 and 7 respectively in directions shown with arrows A (in FIG. 5 and FIG. 8) as the brake shoes 6 and 7 mutually part from. For this, concave-convex contact face (between a concave spherical face and a convex spherical face) of the centripetal couplings 19 and 21, and an end face of the adjusting screw 20 and the centripetal coupling 21 are kept not to generate small gaps, and noise generation is effectively prevented thereby when the brake is switched on and off.

Next, the above-mentioned plate body 2, etc. are further concretely described with reference to Figures. The plate body 2 is approximately rhombus as shown in FIG. 1, the adjusting screw 20 is attached to a lower end apex of the plate body 2, the guiding rods 4 are disposed on a left apex and a right apex of the plate body 2 respectively, and a reinforcing rod 27 is disposed on an upper apex. And, a lock nut 28 is screwed on the adjusting screw 20.

Figure 5:
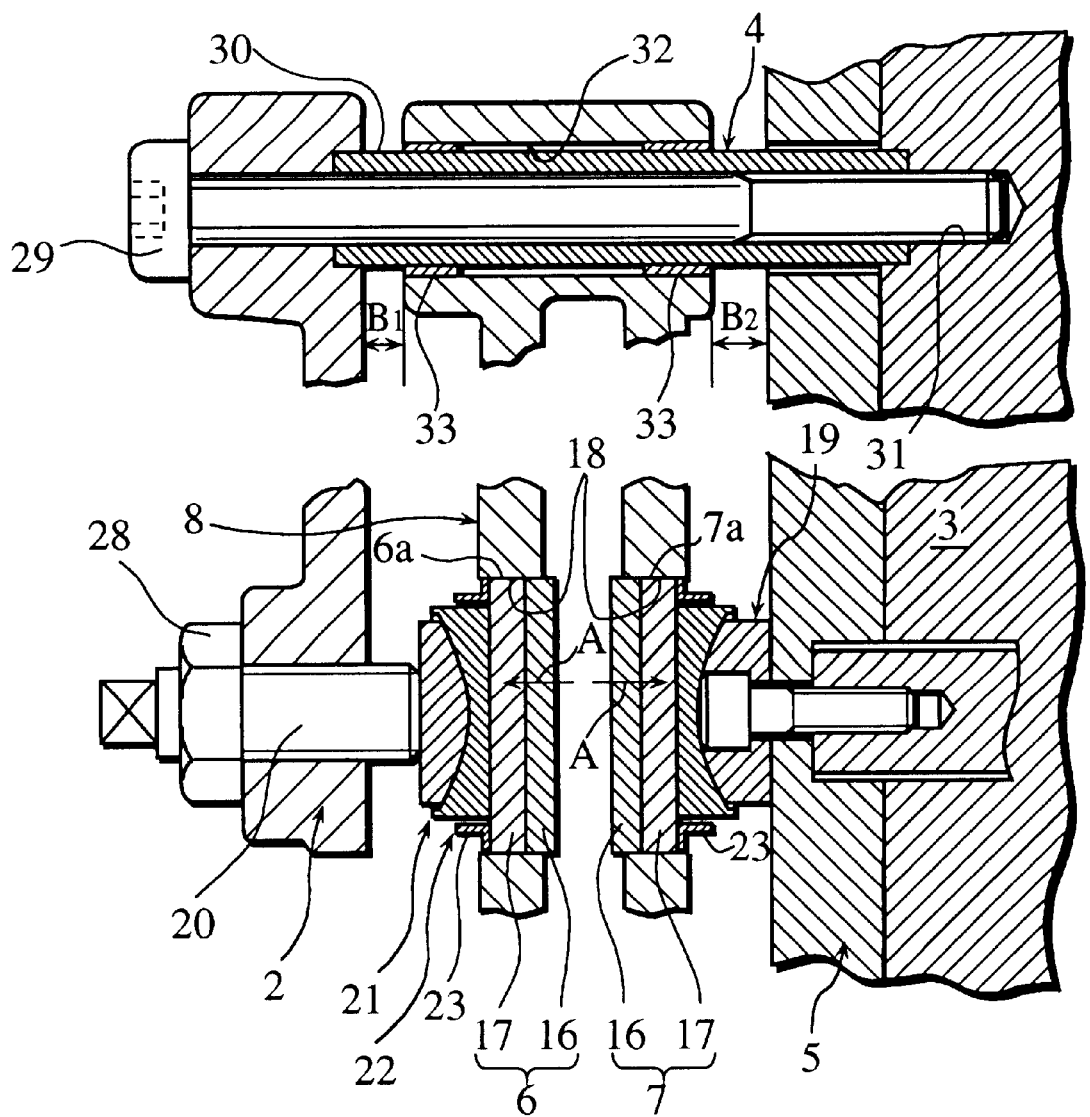
FIG. 5 is an explanatory view with cross-section of a principal portion.

As shown in FIG. 5, the guiding rod 4 consists of a long bolt 29 and a cylinder body 30. The long bolt 29 is screwed into a tapped hole 31 of the fixed iron core 3, and both end portions of the cylinder body 30 are respectively press-fitted to a counterbore of the fixed iron core 3 and a counterbore of the plate body 2.

Each of the above-described guiding rods 4 is inserted to each of holes 32 on both end part of the upper side of the arch-shaped bracket 8 shown in FIG. 4, and an inner peripheral face of the hole 32 and a peripheral face of the cylinder body 30 can slide. And, in FIG. 5, slide movement becomes smooth for slide bushings 33 inserted in the hole 32. As described above, the unit U, composed of the electromagnet portion 1, the plate body 2, and the guiding rods 4, is attached to the bracket 8 as to be able to float for a micro dimension.

The reinforcing rod 27 prevents the plate body 2 from falling down, which is caused for strong reaction force (in the directions of the arrows A) when the brake shoes 6 and 7 press the braked body 9, in a direction that interval between the upper apex of the rhomboid plate body 2 and the electromagnet portion 1 decreases. In other words, a function of the reinforcing rod 27 is a function as a strut.

A small protruding piece 34 is respectively formed on the left apex and the right apex of the rhomboid plate body 2 in FIG. 1, and , on the other hand, a small protruding piece 35 similar to the small protruding piece 34 is respectively formed on a left end portion and a right end portion of the upper side of the bracket 8 in FIG. 4. A tapped hole 35a is formed on the small protruding piece 35.

As described above, the unit U is attached to the bracket 8 as to be able to float for a micro dimension, namely, as to move for a micro aperture $B_1$ and a micro aperture $B_2$ as shown in FIG. 2, FIG. 3, and FIG. 5, and elastic members 36, which push the plate body 2 as to part from the bracket 8 (in a rightward direction in FIG. 2), are provided. In FIG. 2, the elastic member 36 consists of a pressed coil spring.

Further, regulating members 37, which regulate the plate body 2 not to excessively move in the (above-described) parting direction, are provided. In FIG. 2, the regulating member 37 is composed of a bolt 38 screwed into the former-described tapped hole 35a and a nut 39 (for locking).

As described above, centering of the unit U is conducted with the elastic members 36 and the regulating members 37, and air gaps between the brake pad portions 16 of the brake shoes 6 and 7 and the braked body 9 (when not braked) can be regulated.

Especially, there is a merit that simplification of the construction and cost reduction can be obtained when the elastic member 36 and the regulating member 37 are compactly united by insertion of the bolt 38 to the pressed coil spring as shown in FIG. 2. And, although the unit U may incline to the heavy electromagnet portion 1 side in a floating state and the brake pad portions 16 may ununiformly contact (slide on) the braked body 9 such as a disc for the weight of the electromagnet portion 1 is heavy in comparison with the weight of the plate body 2, the above-described elastic members 36 ingeniously keep the balance of the unit U by pushing the plate body 2 in the direction that the plate body 2 parts from the fixed bracket 8.

Figure 9:
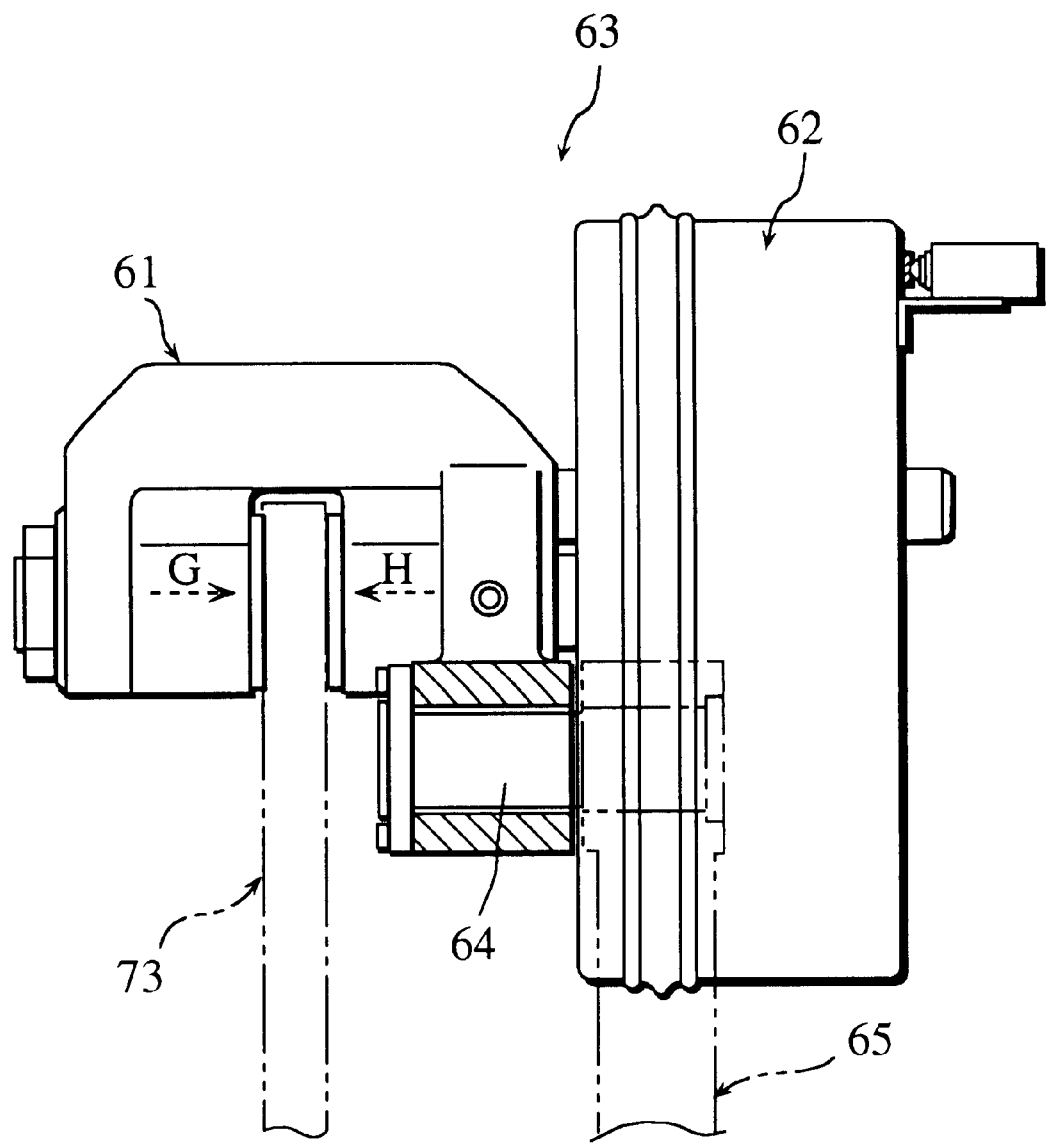
FIG. 9 is a front view showing a conventional example.
Figure 10:
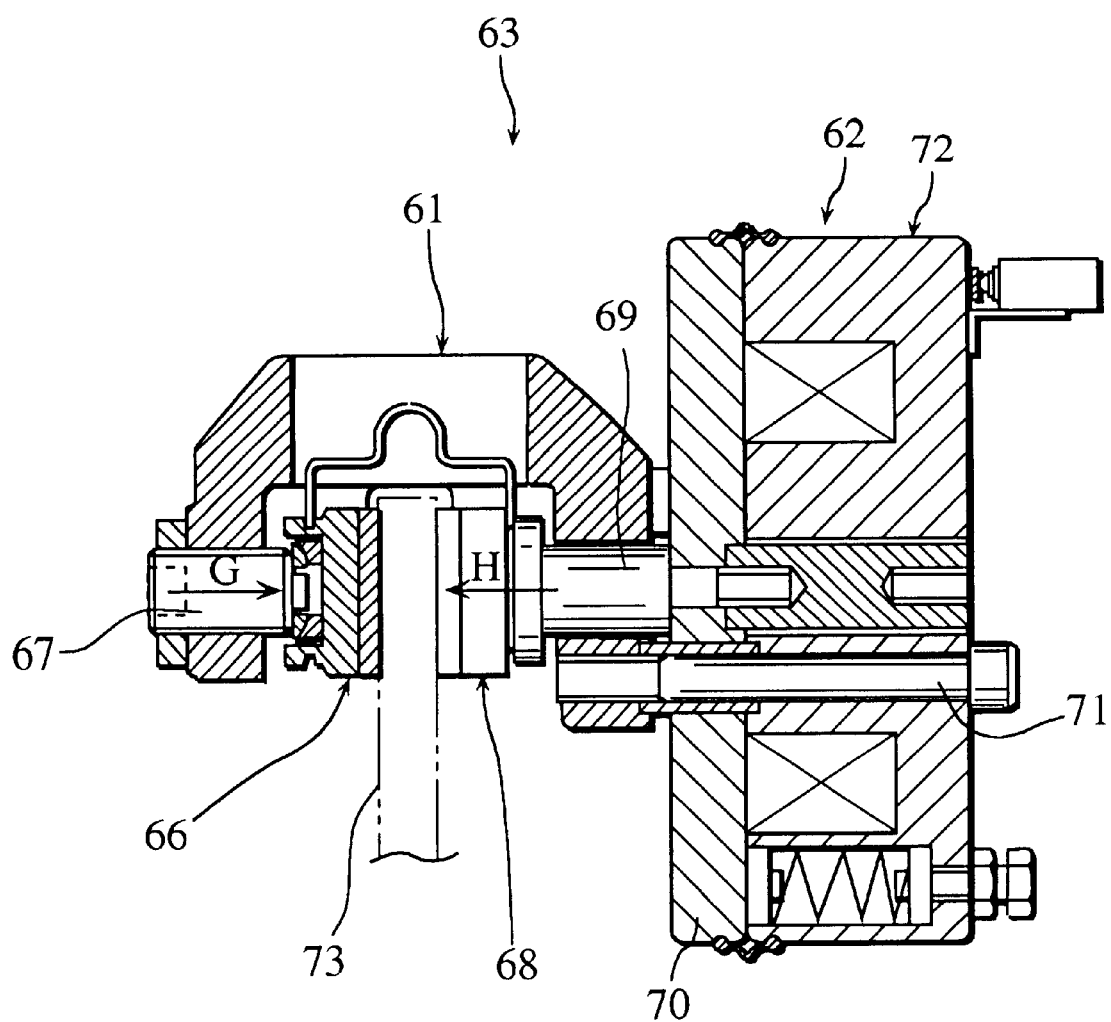
FIG. 10 is a cross-sectional front view showing the conventional example.

According to the electromagnetic brake of the present invention, the plate body 2 and the guiding rods 4 can be downsized and lightweight for the tangent force $F_1$ from the braked body 9 in braking is received through the braking force receiving bracket 8 and not transmitted to the plate body 2 and the guiding rods 4. And, a conventional large-volume caliper of block (refer to the mark 61 in FIG. 9 and FIG. 10) can be omitted, and simplification of the construction and compactification as a whole can be obtained. Especially, horizontal dimension in FIG. 2 and FIG. 3 can be reduced.

And, gaps of concave-convex contact face of the centripetal coupling 21 and of the adjusting screw 20 are not generated, and working noise of switching on and off of brake can be reduced. And electromagnetic power of the electromagnet portion 1 can be fully utilized for the minimized gaps. And, the centripetal couplings 19 and 21 can be thin and having a simple structure.

Further, centering of the unit U can be certainly conducted with a simple construction of the brake. Especially, the brake pad portions uniformly contact the braked body 9 because weight unbalance that the electromagnet portion 1 is heavy to the plate body 2 can be reduced with the elastic members 36, and the unit U is centered on the braked body 9.

While preferred embodiments of the present invention have been described in this specification, it is to be understood that the invention is illustrative and not restrictive, because various changes are possible within the spirit and indispensable features.

What is claimed is:

1. An electromagnetic brake comprising a construction in which:

a plate body is disposed next to an electromagnet portion with a predetermined interval;

a fixed iron core of the electromagnet portion and the plate body are connected and united with plural guiding rods, and a braking force receiving bracket for receiving one pair of brake shoes and tangent force of the pair of brake shoes is disposed between the electromagnet portion and the plate body;

the braking force receiving bracket is fixed to a fixation member;

one of the pair of brake shoes is attached to a moveable iron core side of the electromagnet portion through a centripetal coupling composed of two small metal plates one of which has a convex surface and the other of which has a concave surface, and the other of the pair of brake shoes is attached to the plate body side through an adjusting screw and a centripetal coupling composed of two small metal plates one of which has a convex surface and the other of which has a concave surface; and concave and convex contact faces of each of the centripetal couplings are held tightly fitting as not to generate small gaps, by one pair of return springs each of which is made by punch press of steel plate as to have an approximately rectangular configuration from which plural leg pieces protrude, continuously pushing the brake shoes in directions that the brake shoes mutually part from, each of which is disposed between each of the brake shoes and the bracket, wherein the braking force receiving bracket holds and surrounds the pair of brake shoes.

2. An electromagnet brake comprising a construction in which:

a unit is composed of an electromagnet portion, a plate body, and plural guiding rods which connect and unite the electromagnet portion of the plate body keeping a predetermined interval between the electromagnet portion and the plate body;

a braking force receiving bracket as to be able to float for a micro dimension; and centering of the unit on a braked body is conducted by elastic members, each of which is composed of a pressed coil spring elastically pushing the plate body in a direction that the plate body parts from the bracket, and regulating members, each of which is composed of a bolt and a nut, regulating the plate body not to excessively move in the parting direction of the plate body, wherein the braking force receiving bracket holds and surrounds the pair of brake shoes.

* * * * *